United States Patent [19]

Balloni et al.

[11] 4,144,363

[45] Mar. 13, 1979

[54] PROCESS FOR COATING POLYOLEFIN FILMS

[75] Inventors: Riccardo Balloni, Vedano al Lambro (Milan); Pierpaolo Buzio; Vito Galli, both of Rho, (Milan), all of Italy

[73] Assignee: Societa Italiana Resine S.I.R. S.p.A., Milan, Italy

[21] Appl. No.: 694,631

[22] Filed: Jun. 10, 1976

[30] Foreign Application Priority Data

Jun. 11, 1975 [IT] Italy .................. 24241 A/75

[51] Int. Cl.$^2$ ............................. B05D 3/10
[52] U.S. Cl. ...................... 427/322; 427/385 B; 427/407 E
[58] Field of Search ........... 427/385 B, 322, 407 E, 427/388 A, 385 R, 340, 342; 428/518, 520; 526/135, 145, 146, 147, 343, 317, 318, 319; 260/31.2 R, 32.8 R, 33.2 R, 33.8 UA, 29.6 TA; 252/435, 437, 426

[56] References Cited

U.S. PATENT DOCUMENTS

| | | | |
|---|---|---|---|
| 2,923,653 | 2/1960 | Matlin et al. | 260/29.6 TA |
| 2,973,285 | 2/1961 | Berke | 427/342 |
| 3,160,601 | 12/1964 | Hyde | 252/426 |
| 3,345,196 | 10/1967 | Goldbeck | 427/385 B |
| 3,345,350 | 10/1967 | Shavit et al. | 526/192 |
| 3,366,590 | 1/1968 | Taft | 260/29.6 TA |
| 3,387,997 | 6/1968 | Sculley | 427/385 B |
| 3,551,391 | 12/1970 | Crocker et al. | 252/426 |
| 3,557,041 | 1/1971 | Loshack | 427/385 B |
| 3,622,657 | 11/1971 | Vasta | 260/31.2 R |
| 3,660,141 | 5/1972 | Yoshiyaso et al. | 427/385 B |
| 3,745,038 | 7/1973 | Jeffs | 427/385 B |
| 3,788,878 | 1/1974 | Wheelock | 427/341 |
| 3,860,568 | 1/1975 | Chabert et al. | 526/135 |
| 3,886,129 | 5/1975 | Kurz et al. | 260/33.80 A |
| 3,904,572 | 9/1975 | Huang et al. | 260/33.80 A |
| 3,935,368 | 1/1976 | Weiss | 427/385 B |
| 3,946,139 | 3/1976 | Bleyle | 428/518 |
| 3,959,526 | 5/1976 | Swerlick | 427/385 B |
| 3,999,834 | 12/1976 | Ohtono | 427/385 B |

FOREIGN PATENT DOCUMENTS

792812   4/1958   United Kingdom .................. 526/146

Primary Examiner—Ronald H. Smith
Assistant Examiner—Janyce A. Bell
Attorney, Agent, or Firm—Sughrue, Rothwell, Mion, Zinn and Macpeak

[57] ABSTRACT

A surface-activated polyolefin is coated by applying a solution in an organic solvent of a vinylidene copolymer material containing from 35 to 60 wt.% of vinylidene chloride, from 30 to 50 wt.% of alkyl ester of acrylic or methacrylic acid, from 1 to 10 wt.% of acrylic and/or methacrylic acids and from 1 to 10 wt.% of hydroxyalkyl ester of acrylic or methacrylic acid, a ratio of from 0.5:1 to 5:1 being maintained in the material between the number of carboxyl groups and the number of hydroxyl groups and said solution containing a latent catalyst for the cross-linking of said material, and heat-treating at 70°–130° C. said coated film to provoke said cross-linking.

The coating shows an excellent adhesion to the film and improves the thermal weldability, impermeability and flexibility of the latter.

15 Claims, No Drawings

PROCESS FOR COATING POLYOLEFIN FILMS

The present invention relates to a process for coating polyolefin films with vinylidene chloride copolymers (vinylidene copolymers) dissolved in an organic solvent, as well as the materials obtained by means of this process.

An important field of application of materials such as films and sheets is in packaging, especially of food products.

For such applications the films must have characteristics such as impermeability, flexibility and thermal weldability and must moreover be non-toxic and as free from odour as possible.

Polyolefin films do not possess such a combination of characteristics and therefore recourse is made in the art to coating them with a vinylidene copolymer.

As is known, coating of polyolefin films is difficult, mainly on account of the poor reactivity of the film surface which is of a non-polar and hydrocarbon structure.

Therefore, recourse is made in the art to a preliminary surface-activation treatment, such as for example with chemical reagents, non-perforating continuous electrical discharges, flames and such like.

Notwithstanding these treatments, which modify the chemical structure of the surface (in particular by creating some functional groups), the reactivity of the surface is generally insufficient to permit good adhesion with conventional vinylidene copolymers.

It has now been found that it is possible to overcome these difficulties and to apply a vinylidene copolymer material onto polyolefin films, obtaining perfectly adhering coatings, with a single application. Moreover, the resulting coated films possess a combination of characteristics, such as thermal weldability, impermeability and flexibility, as well as absence of odour and toxicity, which allow their use in the field of packaging, especially packaging of food products.

Thus, the invention provides a process for coating a surface-activated polyolefin film with a vinylidene copolymer material, characterized by (a) applying to the surface of said film a solution in an organic solvent, of a vinylidene copolymer material containing in copolymerized form from 35 to 60 wt.% of vinylidene chloride, from 30 to 50 wt.% of one or more alkyl esters of acrylic and/or methacrylic acid, from 1 to 10 wt.% of acrylic and/or methacrylic acids and from 1 to 10 wt.% of one or more hydroxyalkyl esters of acrylic and/or methacrylic acid, a ratio of from 0.5:1 to 5:1 being maintained in said material between the number of carboxyl groups and the number of hydroxyl groups, said material consisting of one or more copolymers each comprising moieties of said vinylidene chloride and said alkyl esters, any copolymer which does not include moieties of said hydroxyalkyl esters containing moieties of said acrylic and/or methacrylic acids, and said solution containing a latent catalyst for the cross-linking of said material consisting of a substance liberating acid at a temperature of at least 70° C., and (b) heat-treating the thus coated film at a temperature of from 70° C. to 130° C., to dry said film and provoke said cross-linking.

Salts which decompose at the said temperatures and which are derived from organic or inorganic acids and amines, especially tertiary amines, or acid esters of polybasic in organic acids or polycarboxylic organic acids with aliphatic alcohols, are particularly useful as catalysts.

The vinylidene copolymer materials useful for the purposes of the present invention contain from 35 to 60% by weight of vinylidene chloride. When the vinylidene chloride content is increased, the characteristics relating to impermeability are emphasised, whilst a low content in said monomer allows a greater thermal weldability to be conferred to the coated films.

Obviously the vinylidene chloride content of the copolymer material is selected in each case, although always within the range of values defined above, according to the property which it is intended to emphasise in the coated polyolefin film.

In general, copolymer materials having a vinylidene chloride content of from 40 to 60% by weight are preferred, as they adhere perfectly to the polyolefin films and confer a desired combination of characteristics to the latter.

In any case, it is never profitable to lower the vinylidene chloride content in the copolymer material below 35% by weight in order to avoid depressing the impermeability characteristics excessively. On the other hand contents of more than 60% by weight of this monomer are not desirable as the resistance to welding of the coated film becomes poor and thus all the requirements needed for packaging are not satisfied.

The vinylidene copolymer materials used for the purposes of the present invention contain one or more alkyl esters of acrylic and/or methacrylic acids in an amount of from 30 to 50% by weight.

Alkyl esters preferred for the purpose are those whose alkyl radical contains from 1 to 12 carbon atoms, such as, for example methyl, ethyl, butyl, isobutyl and 2-ethylhexyl acrylates and methacrylates.

The best results are obtained with an alkyl ester content of from 34 to 45% by weight in the copolymer material, in that the best compromise, as far as the combination of characteristics of the coated polyolefin films is concerned, is achieved in this range.

The copolymer material also contains as essential constituents from 1 to 10% by weight of acrylic or methacrylic acid, or mixture of the two, and from 1 to 10% by weight of one or more hydroxyalkyl esters of said acids.

The hydroxyalkyl radical of said esters may contain from 1 to 12 carbon atoms and the hydroxyl group may be located at the end of the chain or in an intermediate position.

Examples of said esters are: 2-hydroxyethyl acrylate and methacrylate and 2-hydroxypropyl acrylate and methacrylate. The content of acid and in hydroxyester of the copolymer material is critical, as satisfactory cross-linking is not achieved with values below 1% by weight, with resultant decrease in the physical characteristics of the coated film. On the other hand an excessively high degree of cross-linking as experienced with values above 10% by weight is undesirable as the thermal weldability characteristics are affected.

It has been found that the value of the ratio between the carboxyl and hydroxyl groups in the vinylidene copolymer material is also critical with regard to the characteristics that are intended to be conferred on the coated polyolefin films.

In particular high adhesion of the vinylidene copolymer material to the polyolefin film is achieved by maintaining the ratio between the carboxyl groups and hydroxyl groups in the said material at a value of from 0.5:1 to 5:1. The best results relating to adhesion, as well as to the other characteristics of the coated polyolefin films, are obtained when the acrylic and/or methacrylic acids, and also the hydroxyalkyl esters of these acids, are present in the vinylidene copolymer material in an amount of from 3.0 to 7.5% by weight and when the hydroxyl groups and the carboxyl groups are equal or about equal in number.

The vinylidene copolymer material is applied onto the polyolefin film in the form of a solution in a suitable solvent which may be chosen from a wide class of compounds such as for example: ketones (methylethyl ketone, methylisobutyl ketone, dimethyl ketone, diethyl ketone and dibutyl ketone), glycol ethers of ethylene glycol (particularly methyl, ethyl and butyl monoethers), esters of saturated aliphatic acids, in particular of acetic acid (especially methyl, ethyl and butyl acetates) and monoethers of diethylene glycol (especially the methyl, ethyl and butyl monoethers).

Such compounds may be used alone or in mixture and the concentration of the vinylidene copolymer material in the solution is generally maintained at a value of from 20 to 40% and preferably of the order of 30% by weight. The solution also contains a cross-linking catalyst capable of instigating interaction between the carboxyl and hydroxyl groups present in the copolymer material.

This catalyst must have an acid nature and must exert its effect at temperatures not less than 70° C. Compounds suitable for this purpose are the salification products of an organic or inorganic acid with an amine, especially a tertiary amine, which decompose in the desired range of temperatures with liberation of the acid, or acid esters of polybasic inorganic acids or polycarboxylic organic acids with aliphatic alcohols.

In practice these compounds are latent catalysts as they do not exert their activity at low temperatures (at ambient temperatures for example), thus permitting stocking and handling of the solution without instigating undesired phenomena of premature cross-linking.

Examples of such catalysts are products of the salification of maleic, fumaric, para-toluene-sulphonic or phosphoric acid, with a tertiary amine such as trimethylamine, triethylamine, propyldimethylamine and triisopropylamine.

Acid ester catalysts useful for the purpose are for example: monobutylphosphate, dibutylphosphate, monobutyl maleate and monobutyl phthalate.

Said latent catalyst is generally present in the solution in an amount of from 0.005 to 5 wt.%, and preferably from 0.1 to 1 wt.% with respect to the copolymer material.

The vinylidene copolymers useful for the purposes of the present invention may be obtained by any method of polymerization known in the art.

Those preferred however, are obtained by means of the process described in our co-pending patent application Ser. No. 602,834 filed on Aug. 7, 1975 now U.S. Pat. No. 4,029,865 according to which the monomers are brought into contact with a catalytic system comprising an organic per-compound, an organo-metallic compound of zirconium or cobalt (generally a naphthenate, octoate or acetyl-acetonate) and an acid compound according to the Lewis-Brondsted definition, preferably p-toluene sulphonic acid. According to the said patent application the reaction is carried out in an organic solvent in which the monomers, the copolymer and the catalytic system are soluble, polymerization occurring at high speeds, at low temperatures (less than 30°–35° C.) and with practically complete conversion of the monomers. Thus a solution of vinylidene copolymer material in the organic solvent, directly usable for coating the polyolefin films, is obtained as a product of the reaction. Moreover, the acid, once its catalytic function in the polymerization is finished, may be salified with the stoichiometric quantity of a tertiary amine, thus producing the latent cross-linking catalyst mentioned above.

Vinylidene copolymer materials useful for the purposes of the present invention may be obtained by copolymerization of all the monomers in the form of a single copolymer. Mixtures of copolymers, the overall composition of which falls within the ranges of values defined above, are, however, also useful. Thus, for example, it is possible to copolymerize vinylidene chloride with acrylic and/or methacrylic acid and alkyl esters thereof, thus producing copolymers having carboxyl groups, and to copolymerize vinylidene chloride separately with said alkyl esters and said hydroxyalkyl esters of acrylic and/or methacrylic acids, thus producing copolymers with hydroxyl groups.

By simple mixing of these copolymers, vinylidene copolymer materials may be obtained having the desired values of the ratio of carboxyl groups to hydroxyl groups.

The polyolefin films that are coated according to the process of the present invention, may be obtained according to conventional methods from polymers or copolymers of ethylene or alpha-olefins having up to 5 carbon atoms. Preferred for the purpose are polyethylene or polypropylene films having thicknesses of from 10 to 100 microns, unstretched or mono- or bi-axially stretched.

Best results are obtained by using biaxially stretched isotactic polypropylene films as supports.

The polyolefin film to be coated is surface-activated by means of a conventional pre-treatment, such as for example by means of chemical agents, generally oxidizing solutions, or preferably by a flame treatment or electric discharges in the presence of air or other gases.

A layer of an adhesive promoter ("primer") chosen from among those known in the art, such as, for example, polyimines (generally polyethyleneimine), prepolymerized polyesters or polyesters and isocyanates, usually in an organic solvent, may be applied to the surface of the treated film. The application of such an adhesive promoter is also well known in the art and will not therefore, be further elucidated here.

The application of an adhesive promoter is not necessary for the purposes of the present invention insofar as coated films with elevated characteristics are obtained by applying the vinylidene copolymer solution onto a polyolefin film treated by electric discharges or with chemical agents.

It is obviously possible to coat one or both sides of the polyolefin film, just as it is also possible to coat polyolefin films, one side of which is combined with other materials.

The technique used for applying the solution to the polyolefin film is not critical and may be carried out according to the usual methods, such as, for example those known as gravure roll, reverse roll, kiss roll, application of the solution being followed by drying and cross-linking at a temperature of from 70° to 130° C. and preferably of the order of 110° C., the film being made to pass, for example, through a tunnel coursed by a hot gas (generally air).

The best results are obtained by applying a quantity of from 1 to 5 grams of vinylidene copolymer material onto every m² of surface of the polyolefin film.

It is generally not advantageous to descend below 1 g/m² as coated films unfit for many purposes are obtained, whilst no substantial benefits are obtained with quantities of vinylidene copolymer material exceeding 5 g/m². The best results are obtained with quantities of vinylidene copolymer material of from 1.5 to 3 g/m².

Coating of the polyolefin film is easily obtained by means of a single application of the solution. Obviously, if desired, more layers of the coating may be applied without departing from the scope of the invention.

The characteristics of the resulting coated polyolefin films depend to a certain extent on the composition of the vinylidene copolymer material used for the coating. In fact the ability to emphasize one or more characteristics of the coated films by varying the composition of the vinylidene copolymer material, and also the ratio between the carboxyl and hydroxyl groups in said material and hence the degree of cross-linking in the latter, constitutes an aspect peculiar to the present invention.

In each case, in addition to great adhesion of the coating to the support, the films coated according to the present invention show excellent characteristics of impermeability to water vapour, gases, fats and odours, and of flexibility, as well as a facility to resist handling to which the manufactured products are subjected.

Such coated films can moreover be heat welded, are odour free, non-toxic and do not display the undesirable characteristic known as "blocking."

In the experimental examples which follow the product to be coated is a biaxially stretched polypropylene film, 25–30 microns in thickness, having a tensile strength of 10–15 Kg/mm² lengthwise, and 18–30 Kg/mm² transversally, a elongation at break of 50–200% lengthwise and 20–50% transversally, said determinations being carried out according to ASTM method D-882.

This polypropylene film is treated with corona discharge by means of commercial apparatus, the wettability of the thus treated film being 35–40 dynes/cm according to ASTM D-2578.

In the event of an adhesion promoter being used an aqueous alcoholic solution containing 1 wt.% of polyethyleneimine is applied to the polyolefin film treated by electric discharge, by the kiss roll technique, in an amount of 5–10 mg (as dry matter) for every m² of surface.

The application of the vinylidene copolymer solution is carried out by the "gravure" roll technique.

The compositions of the vinylidene copolymers used in the following Examples are reported in Table 1 wherein the percentages are by weight.

Table 1

| Copolymer | A | B | C | D |
|---|---|---|---|---|
| Vinylidene chloride | 50% | 50% | 50% | 50% |
| Methyl acrylate | 25% | 25% | 25% | 25% |
| Butyl acrylate | 10% | 7.5% | 5% | 3.8% |
| 2-ethylhexyl acrylate | 4.5% | 6.8% | 9% | 10.1% |
| Acrylic acid | 7.1% | 5.7% | 4.3% | 3.6% |
| Hydroxypropyl methacrylate | 3.4% | 5.0% | 6.7% | 7.5% |
| Carboxyl groups/hydroxyl groups ratio | 4.3:1 | 2.3:1 | 2.0:1 | 1.15:1 |

EXAMPLES 1–4

Solutions of the vinylidene copolymers A-D in ethyl acetate having a dry matter content equal to approximately 30% by weight are prepared.

These solutions also contain 0.5% by weight with respect to the vinylidene copolymer of a latent cross-linking catalyst consisting of the product of the neutralisation of paratoluene sulphonic acid with the stoichiometrical equivalent quantity of triethylamine.

The polypropylene film is first treated by corona discharge and polyethyleneimine is then applied in the manner described above.

The application of the vinylidene copolymer solution is then carried out.

The coated film is subjected to tests the results of which are given in Table 2. More particularly in said table are given:

Under (a) the vinylidene copolymer used.
Under (b) the viscosity of the solution of said copolymer, measured at 25° C. in a Ford Cup No. 4, expressed in seconds.
Under (c) the amount of vinylidene copolymer deposited expressed in grams per m² of polypropylene film.
Under (d) the appearance of the coated polypropylene film.
Under (e) the effect of strip delamination.
Under (f), (g), (h) the values of welding resistance, expressed in g/cm., measured in a humid atmosphere at a temperature of 110°, 120° and 130° C. respectively.

The characteristic shown under (e) is determined by coating a length of about 30 cm. of the film, with an adhesive strip an inch wide, with strip to strip adhesion of over 1 Kg/inch valued according to the ASTM D-1876 standard.

The strip is then torn off at constant speed by pulling at 180° in relation to the original position.

The test is carried out in both the longitudinal and transverse directions.

EXAMPLE 5

(by comparison)

The procedure is as in Examples 1 to 4, using a vinylidene copolymer (copolymer E) having the following composition by weight: 50% vinylidene chloride, 25% methyl acrylate, 11.2% butyl acrylate, 3.4% 2-ethylhexyl acrylate, 7.8% acrylic acid, 2.6% hydroxypropyl methacrylate.

In this copolymer the ratio of the number of carboxyl groups to that of hydroxyl groups is of 6.3:1.

The results are given in Table 2.

Table 2

| (a) | (b) | (c) | (d) | (e) | (f) | (g) | (h) |
|---|---|---|---|---|---|---|---|
| A | about 18 | about 1.7 | good | none | 230 | 230 | 255 |
| B | " 18 | " 1.7 | good | none | 250 | 250 | 270 |
| C | " 18 | " 1.7 | good | none | 250 | 350 | 450 |
| D | " 18 | " 1.7 | good | none | 390 | 425 | 455 |
| E | " 18 | " 1.7 | good | none | 150 | 150 | 180 |

EXAMPLES 6 to 9

The procedure is as in Examples 1, 2, 3 and 4, about 2.75 grams of vinylidene copolymer being deposited for each m² of polypropylene film.

The results are shown in Table 3.

EXAMPLE 10

(comparison)

The procedure is as in Examples 6 to 9, using the vinylidene copolymer of Example 5.
The results are shown in Table 3.

Table 3

| (a) | (b) | (c) | (d) | (e) | (f) | (g) | (h) |
|---|---|---|---|---|---|---|---|
| A | about 16 | about | 2.75 | good | none | 370 | 370 | 390 |
| B | " 16 | " | 2.75 | good | none | 400 | 400 | 415 |
| C | " 16 | " | 2.75 | good | none | 405 | 560 | 600 |
| D | " 16 | " | 2.75 | good | none | 500 | 500 | 600 |
| E | " 16 | " | 2.75 | good | none | 200 | 250 | 250 |

EXAMPLE 11

The procedure is as in Example 1, about 1.8 g/m² of copolymer A being applied onto the polyolefin film treated by corona discharge, without application of the polyethyleneimine.

A coated film of good appearance is obtained, showing no delamination at the strip delamination test and having a welding resistance value at 110° C. of 200 g/cm.

We claim:

1. A process for coating a surface-activated polyolefin film with a vinylidene copolymer material, which comprises (a) applying to the surface of said film a solution in an organic solvent, of a vinylidene copolymer material containing in copolymerized form from 35 to 60 wt. % of vinylidene chloride, from 30 to 50 wt.% of one or more alkyl esters of acrylic and/or methacrylic acid, from 1 to 10 wt.% of acrylic and/or methacrylic acids and from 1 to 10 wt.% of one or more hydroxyalkyl esters of acrylic and/or methacrylic acid, a ratio of from 0.5:1 to 5:1 being maintained in said material between the number of carboxyl groups and the number of hydroxyl groups, said material consisting of one or more copolymers each comprising moieties of said vinylidene chloride and said alkyl esters, any copolymer which does not include moieties of said hydroxyalkyl esters containing moieties of said acrylic and/or methacrylic acids, said solution containing a latent catalyst to initiate a cross-linking interaction between the carboxyl and hydroxyl groups of the vinylidene copolymer material, said latent catalyst consisting of a substance liberating acid at a temperature of at least 70° C., and said latent catalyst being the salt of an organic or inorganic acid with a tertiary amine, or an acid ester of a polybasic inorganic acid or polycarboxylic organic acid with an aliphatic alcohol and (b) heat-treating the thus coated film at a temperature of from 70° C. to 130° C., to dry said film and provoke said cross-linking.

2. The process of claim 1, wherein said latent catalyst is present in said solution in an amount of from 0.005 to 5 wt.% with respect to said material.

3. The process of claim 2, wherein said latent catalyst is present in said solution in an amount of from 0.1 to 1 wt.% with respect to said material.

4. The process of claim 1, wherein said material is applied to the surface of said polyolefin film in an amount of from 1 to 5 grams per m².

5. The process of claim 1, wherein said organic or inorganic acid is selected in the group consisting of maleic, fumaric, paratoluene sulfonic and phosphoric acids and said amine is selected from the group consisting of trimethylamine, triethylamine, propyldimethylamine and triisopropylamine.

6. The proces of claim 1, wherein said surface-activated film is coated with a layer of an adhesive promoter prior to the application of said solution.

7. The process of claim 1, wherein said latent catalyst is selected from the group consisting of monobutyl phosphate, dibutyl phosphate, monobutyl maleate and monobutyl phthalate.

8. The process of claim 1, wherein said material contains from 40 to 60 wt.% of said vinylidene chloride, from 34 to 45 wt.% of said alkyl esters, from 3 to 7.5 wt.% of said acrylic and methacrylic acids and from 3 to 7.5 wt.% of said hydroxyalkyl esters.

9. The process of claim 1, wherein said alkyl esters contain from 1 to 12 carbon atoms in the alkyl radical.

10. The process of claim 1, wherein said alkyl esters are selected from the group consisting of methyl, ethyl, butyl, isobutyl and 2-ethylhexyl acrylates and methacrylates.

11. The process of claim 1, wherein said hydroxyalkyl esters contain from 1 to 12 carbon atoms in the hydroxyalkyl radical.

12. The process of claim 1, wherein said hydroxyalkyl esters are selected from the group consisting of 2-hydroxyethyl acrylate and methacrylate and 2-hydroxypropyl acrylate and methacrylate.

13. The process of claim 1, wherein said solution contains from 20 to 40 wt.% of vinylidene copolymer material.

14. The process of claim 1, wherein said organic solvent is selected from the group consisting of ketones, glycol ethers of ethylene glycol, esters of saturated aliphatic acids and diethylene glycol monoethers.

15. A process for coating a surface-activated polyolefin film with a vinylidene copolymer material, which comprises (a) applying to the surface of said film a solution in an organic solvent, of a vinylidene copolymer material containing in copolymerized form from 35 to 60 wt. % of vinylidene chloride, from 30 to 50 wt. % of one or more alkyl esters of acrylic and/or methacrylic acid, from 1 to 10 wt.% of acrylic and/or methacrylic acids and from 1 to 10 wt.% of one or more hydroxyalkylesters of acrylic and/or methacrylic acid, a ratio of from 0.5:1 to 5:1 being maintained in said material between the number of carboxyl groups and the number of hydroxyl groups, said material consisting of one or more copolymers each comprising moieties of said vinylidene chloride and said alkyl esters, any copolymer which does not include moieties of said hydroxyalkyl esters containing moieties of said acrylic and/or methacrylic acids, said solution containing a latent catalyst to initiate cross-linking interaction between the carboxyl and hydroxyl groups of the vinylidene copolymer material, said latent catalyst consisting of a substance liberating acid at a temperature of at least 70° C., and said latent catalyst being the salt of an organic or inorganic acid with a tertiary amine, and (b) heat-treating the thus coated film at a temperature of from 70° C. to 130° C., to dry said film and provoke said cross-linking.

* * * * *